United States Patent
Duffy et al.

[15] 3,659,491
[45] May 2, 1972

[54] ROTATABLE NUT AND WASHER ASSEMBLY

[72] Inventors: William B. Duffy, Berkeley Heights; Charles K. Fisher, Belford, both of N.J.

[73] Assignee: TRW Inc., Cleveland, Ohio

[22] Filed: Mar. 8, 1971

[21] Appl. No.: 121,636

[52] U.S. Cl. ..................................................85/32, 151/38
[51] Int. Cl. ....................................F16b 37/02, F16b 43/00
[58] Field of Search..................85/50, 32, 32 V; 151/34, 35, 151/36, 37, 38

[56] References Cited

UNITED STATES PATENTS

| | | | |
|---|---|---|---|
| 1,961,470 | 6/1934 | Winchester et al. | 85/32 R |
| 2,851,079 | 9/1958 | Heller | 151/38 |
| 3,016,941 | 1/1962 | Coldrem | 151/38 |
| 3,087,371 | 4/1963 | Orner | 85/32 R |
| 3,331,272 | 7/1967 | Hanneman | 85/32 R |
| 3,425,473 | 2/1969 | Knowlton | 151/38 |

FOREIGN PATENTS OR APPLICATIONS

| | | | |
|---|---|---|---|
| 929,807 | 6/1963 | Great Britain | 85/32 R |
| 674,940 | 10/1929 | France | 151/38 |

*Primary Examiner*—Marion Parsons, Jr.
*Attorney*—Philip E. Parker, James R. O'Connor and Gordon Needleman

[57] ABSTRACT

A fastener assembly wherein a sheet metal nut is rotatably coupled to a frusto-conical washer. The nut has an inner threaded barrel portion for engaging a cooperating male fastener element and an outer barrel portion which is particularly shaped for engagement by a tool for rotating the nut. The inner barrel portion is spacedly nested within the outer barrel portion and the respective barrel portions are joined at the upper end of the nut. The lower end of the inner barrel portion extends through a central aperture in the washer and is loosely curled under the edge of the aperture to provide a retaining collar. Adjacent the lower end of the inner barrel portion and the retaining collar, the inner barrel portion carries a peripheral bearing ring having a smooth undersurface lying at a selected acute angle to the longitudinal axis of the nut. The bearing ring is formed from metal skived from the outer wall of the inner barrel portion and compacted into the said ring configuration. The washer embodies a cylindrical lip projecting from its upper surface adjacent the aperture therein, and said lip has a smooth inboard surface which is complementary to and confronts the undersurface of the bearing ring on the nut. The outer barrel portion of the nut also includes a peripheral skirt at its lower end which rotatably bears on the adjacent convex face of the washer. The nut and washer components are free spinning with respect to each other and the said fastener assembly provides for a markedly improved torque-tensile relationship when the nut is turned onto a male fastener element and the washer is tightened against the confronting surface of an apertured member through which the male element protrudes.

14 Claims, 9 Drawing Figures

Patented May 2, 1972 3,659,491

INVENTORS
WILLIAM B. DUFFY
CHARLES K. FISHER
BY
James R. O'Connor
ATTORNEY

ROTATABLE NUT AND WASHER ASSEMBLY

BACKGROUND OF THE INVENTION

1. Field of the Invention

The invention relates to coupled nut and washer assemblies, particularly assemblies of the type wherein the nut is of sheet metal construction and the components of the assembly are freely rotatable relative to one another.

2. Description of the Prior Art

The prior art includes numerous preattached or preassembled nut and washer assemblies. In the earlier art one finds disclosures of integral nut and washer combinations and assemblies wherein the components are separately fabricated but nonrotatably coupled. Characteristic of the foregoing devices is the disclosure of U.S. Pat. No. 2,761,349 (R. M. Heller) wherein combinations and assemblies of both sheet metal and headed components are depicted. While integral and fixed assemblies of the type exemplified by Heller have made a recognized contribution to the art with respect to convenient handling by the user, simplification of packaging and shipping as compared with separate nuts and washers, reduction of the loss of washers to be used with nuts in given installations, and effective insurance that the proper size and shape of washer is consistently available for use in a specified application; it has likewise been recognized that in applying such parts to cooperating bolts or studs and tightening same against a workpiece surface, excessively high torque must be applied to the nut to achieve a desired tension on the bolt or stud in that continuous simultaneous rotation of the nut and washer, subsequent to engagement of the workpiece by the washer, precipitates a markedly increased resistance to turning of the nut and thus an extremely rapid and highly undesirable applied torque increase. In addition, the edge of the washer scores and often gouges or cuts a groove in the confronting workpiece surface and the increasing resistance to rotation creates problems with respect to the peeling, rupturing and deforming of sealing elements when such elements are disposed adjacent the undersurface of the washer.

Having recognized the aforementioned deficiencies in integral or fixed assemblies, designers later moved to eliminate same through the development of combinations wherein the washer element was capable of rotation relative to the nut and wherein the latter component could be headed or sheet metal construction and carry either a multiconvolution thread of a standard type or a single helix thread engager, or a thread cutting or forming element for engaging an unthreaded stud. U.S. Pat. Nos. 2,943,661 (W. Stern), 2,851,079 (R. M. Heller) and British Pat. No. 929,807 (United-Carr Fastener Corporation) contain pertinent disclosures to which reference may be had for a clearer understanding of the advantages to be derived from combinations wherein the components are relatively rotatably coupled. Notwithstanding the fact that the last mentioned Heller and Stern and United-Carr Fastener disclosures placed particular emphasis on the merits of rotatable combinations with respect to the minimization of the risk of deformation or other damage to sealing means employed in conjunction with the parts disclosed therein, the fact remains that the extent to which that objective was realized was primarily attributable to the capacity of the disclosed nuts to rotate independently of any coincident rotation of the washer subsequent to initial clamping engagement of the washer with the confronting surface of a workpiece. However, regardless of the presence or absence of a sealing element, the principal objective sought to be achieved in the construction of rotatably coupled nut and washer assemblies is the reduction of the torque which must be applied to the nut to realize a specified degree of tension on a bolt, screw or stud, etc., onto which the nut is turned. Thus it follows that a construction, particularly with regard to the nut to washer connection, which renders the components free spinning relative to one another and greatly reduces the possibility of any continuing washer rotation subsequent to initial clamping of the washer against a workpiece surface, not only provides for greatly improved torque-tensile relationship in the fastener application but also even further minimizes the potential for sealer deformation, even in situations wherein the bond between the sealing element and the washer is weak or the sealing element per se is structurally defective.

The principal motivating force behind the development of the presently disclosed device was to realize the aforementioned critical objective through an improved rotatably coupled sheet metal nut and washer assembly. The extent to which that purpose has been accomplished can be appreciated by way of a more detailed inspection of the aforementioned patents when considered in the light of the description of a preferred embodiment of the improved assembly which follows hereinafter.

SUMMARY OF THE INVENTION

A fastener assembly of the type wherein a sheet metal nut having inner and outer barrel portions is rotatably assembled with an apertured lock washer. The outer nut barrel portion includes a peripheral skirt which rotatably bears on the washer adjacent the aperture therein. The assembly is particularly characterized by an improved nut to washer connection including a connecting collar on the inner barrel portion which is curled under the internal edge of the aperture in the washer, the washer having a recessed undersurface in which portions of the connecting collar are seated, and a peripheral bearing ring on the inner nut barrel portion disposed adjacent the connecting collar and the washer aperture. The said bearing ring is formed from metal skived from the inner nut barrel portion and compacted into the ring configuration. The bearing ring has a smooth undersurface disposed at a selectively predetermined angle to the longitudinal axis of the nut and the washer has a smooth surface adjacent the aperture therein, which latter surface is complementary to and in confrontation with the undersurface of the bearing ring. Thus, the connecting collar and bearing ring cooperate to maintain the nut and washer in an assembly wherein the said components are free spinning relative to one another. The said construction is particularly adapted to provide an improved torque-tensile relationship in effecting a coupling wherein said fastener assembly is turned onto a cooperating male fastener element protruding through an apertured member and the washer is tightened against the confronting surface of the member.

DESCRIPTION OF A PREFERRED EMBODIMENT

Figure 1:
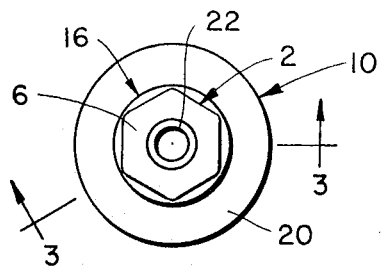
FIG. 1 is a top plan view of a nut and washer assembly according to the invention.

A relatively rotatable nut and washer assembly according to the invention includes a nut 2 drawn from sheet metal and having an inner barrel portion 4 connected at its upper end through a web 6 to an outer, hexagonally shaped barrel portion 8 which circumscribes the inner barrel portion in spaced relationship thereto, and a frusto-conically shaped, spring lock washer 10 which is rotatably coupled to the lower end of the inner barrel portion 4 of the nut.

The lower end of the outer nut barrel portion 8 includes a radially extending peripheral skirt 16 having a smooth undersurface 18 which is complementary to and, in the assembly, rotatably bears on the upper convex surface 20 of the washer 10. The inboard wall of the inner nut barrel portion 4 carries a multiconvolution thread 22 of a standard type which is adapted for threaded engagement with a cooperating bolt. Adjacent its lower end, the outboard wall 24 of the said inner barrel portion carries a peripheral bearing ring 26. The bearing ring 26 is formed from metal skived from the outboard wall 24 and compacted into said ring configuration during fabrication of the nut. Further, the bearing ring has a generally triangular configuration as is clearly seen in the cross sectional views of FIGS. 3, 4 and 6 and also has a smooth, nonburred undersurface 28 disposed at a selected acute angle to the longitudinal axis of the but. The surface 28 is ideally, but not necessarily, at an angle on the order of 45° to the longitudinal axis of the nut or an engaged bolt in that tests have indicated that, when the said under-surface is disposed at an acute angle substantially less than 45°, the frictional resistance to tightening of the nut on a bolt rises appreciably in that the confronting complementary surface of the washer to be described hereinafter tends to clamp or jam the inner nut barrel against the bolt shank to an excessive degree in what might best be described as a collet effect. Immediately adjacent and below the bearing ring 26, the said inner barrel portion terminates in a connecting collar 30 which, subsequent to nut formation and prior to coupling with the washer, lies generally parallel to the aforementioned nut axis.

Figure 5:
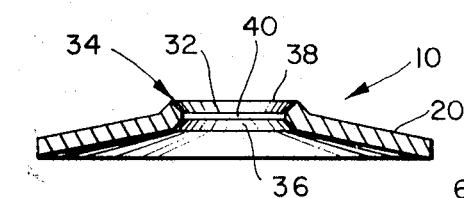
FIG. 5 is an enlarged transverse cross sectional view of the washer component.

As best seen in FIG. 5, the frusto-conical spring lock washer 10 has a central through aperture 32, a generally cylindriform lip 34 projecting upwardly from its convex surface 20 adjacent the aperture 32 and a recess 36 formed in its under or concave face adjacent the said aperture. The inboard surface 38 of the lip 34 has a downwardly tapering, funnel-like configuration and the recess 36 has a generally corresponding but inverted funnel shape and the said respective lip and recess surfaces intersect in a very thin circumferential rim 40 which in effect defines the minor diameter of the aperture 32.

In effecting the assembly of the washer 10 to the nut 2, the initially coaxial collar 30 is inserted into the aperture 32 in the washer and thereafter flared outwardly whereby its terminal end is loosely curled under the circumferential rim 40 and nested in the recess 36. Thus, the undersurface 18 of the skirt 16 is brought to bear against a localized area of the convex face 20 of the washer (said area being generally but not necessarily always less than one-half the total area of said convex face), and the complementary smooth surfaces 28 and 38 of the bearing ring and washer lip, respectively, are also placed in opposed or confronting relationship. While the aforementioned nut to washer connection is relatively loose to permit free spinning of the components relative to one another, the connection is likewise effective to maintain the components in assembly under normal conditions of usage, to wit, during packaging, shipping and repeated applications to and removal from a cooperating bolt.

Figure 6:
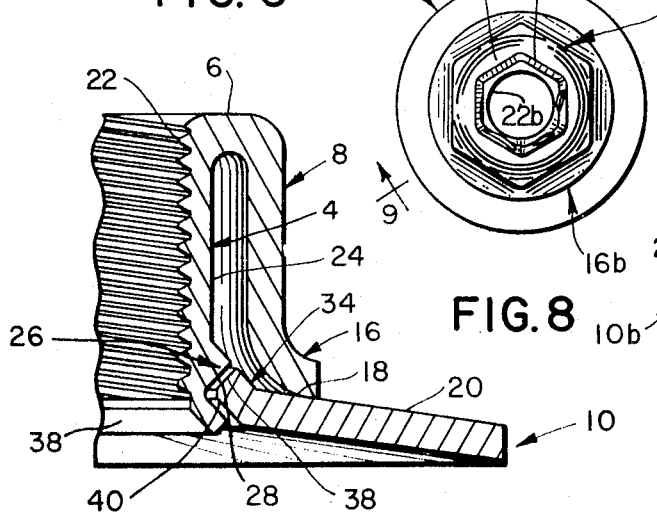
FIG. 6 is a further enlarged view of the right side of FIG. 3 depicting the improved nut to washer connection.

By having particular reference to FIG. 6, the reader will observe what is considered to be an ideal nut to washer connection, i.e., one wherein the nut skirt is in contact with the opposing surface of the washer but there are slight gaps, on the order of .010 inch, between the surfaces 28 and 38 of the bearing ring and washer, respectively, and .005 inch between the opposing portions of the collar 30 and the recess 36. Tests conducted to date indicate that the maintenance of the aforementioned spacing insures a freely rotatable combination and, what is equally significant, insures that the skirt 16 of the nut is always in contact with the confronting washer surface to provide at least a minimal bias of the washer toward the engaged surface of a workpiece and effect a resultant locking tension on a cooperating bolt in a joint wherein relatively low torque is applied to the nut incident to preliminary or even final specified torquing of the nut.

Figure 3:
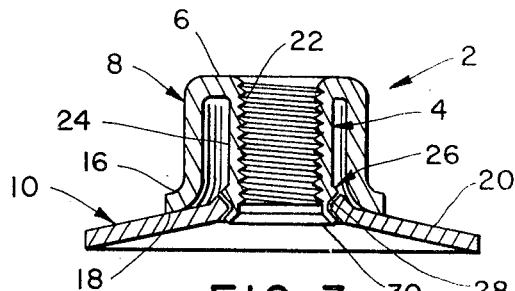
FIG. 3 is an enlarged view of a cross section taken on line 3—3 of FIG. 1.
Figure 2:
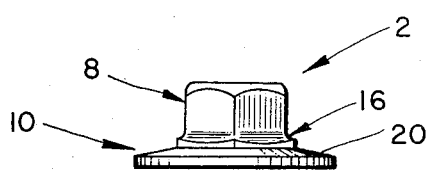
FIG. 2 is a side elevational view of the assembly depicted in FIG. 1.
Figure 4:
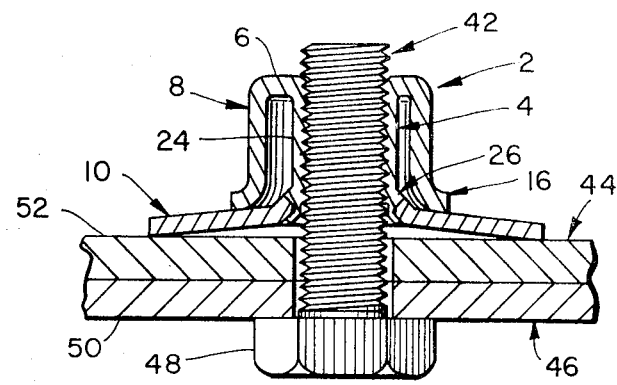
FIG. 4 is a view of the invention similar to FIG. 3 as applied to a cooperating bolt to secure two overlapping apertured members which are depicted fragmentarily and in cross section.

In a typical joint such as that depicted in FIG. 4, the improved fastener assembly is applied to the shank of a threaded bolt 42 to secure a first apertured member 44 to a second apertured member 46 wherein the latter is usually the fixed or base member in the joint. When the nut is turned onto the bolt to the point where the head 48 of the bolt is drawn against the remote surface 50 of the second member 46 and the lower peripheral washer edge is pressed against the proximate surface 52 of the first member 44 under relatively minimal clamping pressure or bias exerted on the washer by the nut skirt, the washer thereupon ceases further corresponding rotation with respect to the nut or the engaged member's surface 52 and independent rotation of the nut may be continued until the specified degree of torque has been applied thereto, as dictated by the tightness desired in the joint, the grade of bolt utilized and other variable factors which will be obvious to those familiar with the art. As may be readily observed from a comparison of FIGS. 3 and 4, continued turning of the nut onto the bolt, absent any further washer rotation, precipitates a discrete flattening of the spring lock washer 10 due to the pressure exerted thereon by the skirt 16, and thus the washer exerts a reverse axial tension on the nut to lock the interengaged nut and bolt threads in the well-known manner. Further, since only the nut component rotates during tightening of the joint, the amount of torque which must be applied to the nut to achieve the desired tension on the bolt is substantially reduced. To put it in other words, during tightening there is negative development of false or unnecessary torque which would otherwise result from coincident rotation of the washer against the confronting surface 52 of the member 44. From a still closer inspection of FIG. 4, one will observe that the progressive build up of tension in the joint incident to the application of ultimate tightening torque to the nut exerts an axial pull on the inner nut barrel which yields downwardly to close the gap between the bearing ring and washer and precipitates a consequent clamping of the confronting washer surface 38 against the opposed surface 28 of the bearing ring. Even after these surfaces are placed in contact and the bearing ring surface is rotating against the washer, the smooth, complementary configuration of the opposed surfaces permits continued unimpeded rotation of the nut with only negligible, if any, increase in the torque required to overcome the minimal increase in rotation resisting friction. Moreover, the presence of the bearing ring in the combination prevents the inner nut barrel from being pulled through the washer aperture as the barrel yields downwardly responsive to the tension build up described above, and, what is equally if not more important, the clamping of the washer against the bearing ring transfers a compressive force from the flattened spring washer directly to the lower and of the inner nut barrel whereby the said barrel end is urged inwardly and the nut thread embraces both the upper and lower faces of the mating bolt thread. When the nut is torqued up to the point where the mating bolt is approaching its ultimate tensional strength, the aforementioned inward pressure on the nut barrel provides for an effective and improved locking and resistance to loosening of the components in the joint. Thus, the bearing ring 26 provides for the effective transfer of at least a portion of the reactive tensional force from the compressed spring washer directly to the inner nut barrel and the engaged threads and contributes a functional improvement in joints of the type disclosed, particularly wherein sheet metal components are utilized. In fact, tests conducted to date indicate that, regardless of the amount of torque required to generate a desired amount of tension in a mating bolt, the ultimate tension which can be derived is approximately doubled when the bearing ring is present at an angle of approximately 45°, as compared with an assembly wherein the inner nut barrel does not embody a bearing ring or equivalent element. It should also be noted that while the surface 28 of the bearing ring was earlier described as being at a selected acute angle to the longitudinal nut axis, the said surface may not necessarily be straight, but rather may be slightly convex while the surface 38 of the washer may be complementarily convex, whereby frictional resistance to relative rotation is further obviated.

Figure 7:
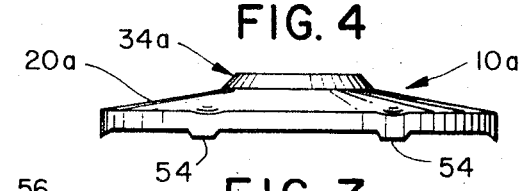
FIG. 7 is an enlarged side elevational view of a slightly modified embodiment of the washer component.

FIG. 7 depicts a slightly modified washer 10a which includes a plurality of spaced projections or teeth 54 depending from the undersurface thereof, which projections or teeth are particularly adapted for biting engagement with the surface of a metallic mounted member to effect an electrical ground where required. The same projections or teeth will also afford additional resistance to washer rotation during nut tightening.

By again having reference to FIGS. 3 and 4, the reader will also readily appreciate that, as compared with an assembly of a headed nut devoid of a peripheral skirt and a rotatable washer, the skirt of the sheet metal nut of the present invention provides a barrier between the convex washer surface 20 and the leading end of a power driven chuck. Ergo, when such a tool is utilized to tighten a nut, the skirt inhibits undesirable scoring or marring of the washer finish beyond the peripheral edge of the nut skirt.

Figure 8:
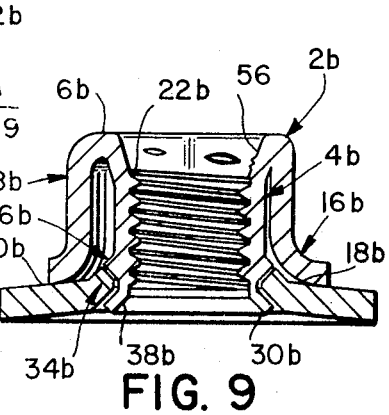
FIG. 8 is a plan view of a modified form of a nut and washer assembly according to the invention.
Figure 9:
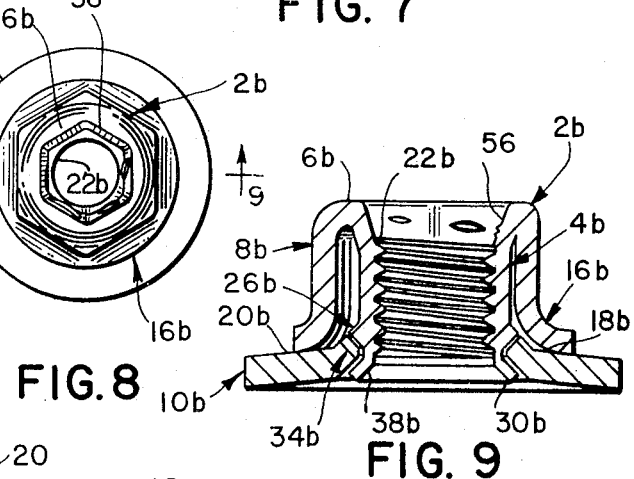
FIG. 9 is an enlarged view of a cross section taken on line 9—9 of FIG. 8.

The modified embodiment of the invention depicted in FIGS. 8 and 9 is essentially the same as earlier described, particularly with reference to the nut to washer connection. Further, the modified form is designed to function in the same manner in cooperation with a bolt in a joint and may carry the alternate type of toothed lock washer depicted in FIG. 7. However, in adapting the invention to accommodate larger sizes of bolts, i.e. bolts on the order of ¼ inch diameter or larger, it was observed that during final tightening wherein the ultimate tensional strength of the bolt was being approached, it became somewhat difficult to deliver the torque required to rotate the inner nut barrel through the wrenching faces of the outer hex barrel and the other barrel frequently sheared away from the tubular inner barrel at the connecting web. Responsive to further experimentation, it was discovered that the aforementioned problem in larger sizes could be negated by providing a hex-shaped depression 56 in the upper end of the inner nut barrel 4b during the process of nut formation and prior to the tapping of the said barrel. There are several reasons why the formation of the hex depression 56 is seen to strengthen the nut and increase its torsional resistance to shearing at the web. To begin with, one will readily appreciate that the compacting of the metal, incident to depression formation, work hardens the metal to impart increased strength in the critical area. Further, as is best depicted in FIG. 9, the metal at the internal wall of the hex depression is displaced outwardly of the path of the threading tap, ergo only partial, if any, thread is formed in the depression and consequently there is negligible weakening of the wall adjacent the web. Still further, and perhaps most significant, is the fact that the internal hex depression provides positive driving faces in the inner nut barrel adjacent the web, which faces oppose and match the hex wrenching faces on the outer barrel and thus reduce the torsional strain on the barrel connecting web incident to ultimate tightening.

Having considered the foregoing detailed description, one who now refers back to the United-Carr Fastener (hereinafter called UCF) and Heller '079 patents earlier mentioned will readily recognize the improvements in the art which are the contribution of the present disclosure and in which invention is seen to abide.

In the UCF teaching, which discloses a double barreled, sheet metal nut in the assembly, there exists an obvious lack of any upper supporting or bearing element for the portion 9 of the washer 6. Further, the connecting elements of the nut and washer intersect at substantially right angles and relatively sharp corners which provide possible impediments to independent rotation or potential increased frictional resistance to turning of the nut. Another important aspect of the present invention which is best understood by a comparison with the UCF disclosure is that a substantial narrowing of the space between the inner and outer barrel portions even to the point that they are abutting, as is frequently the case with larger size nuts requiring thicker material and an enlarged inner barrel, has no adverse affect on the nut to washer connection or the relative free spinning capabilities of the present components, whereas a similar narrowing of the spacing between the inner and outer barrels in UCF would cause a rotation inhibiting, jamming or binding of the washer portion 9. Obviously, it follows that the required spacing which must be maintained in the UCF nut gives rise to increased production costs by reason of the additional stock which must be used in fabricating larger sized nuts to be coupled to the washer in the manner disclosed therein.

The Heller '079 disclosure of a single walled sheet metal nut with a single helix thread form is also considered deficient in that the assembly lacks any bearing ring or other upper support for tubular portion 32 of the washer. Further, the Heller nut to washer connection certainly does not recommend itself for use with a double barreled nut of the present type in that excessively wide spacing between the nut barrels would be required to receive the preflared end of the tubular washer portion 32, or a swaging or flaring tool which would have to pass between the nut barrels to curl the washer over the dimple 36 of the nut if the washer were first inserted in a perfectly tubular condition.

The reader, who should now have a clear understanding of the merits of the present disclosure, should proceed to refer to the claims which follow for a more precise definition of the scope of the invention protected by these Letters Patent.

1. In a fastener assembly of the type wherein a nut is rotatably connected to a washer, and wherein the nut is of sheet metal construction and includes an inner threaded barrel portion, an outer barrel portion joined to the upper end of the inner barrel portion and circumscribing the inner barrel portion in at least partially spaced relationship thereto and having a peripheral skirt extending outwardly from its end remote from the junction with the inner barrel portion, and wherein the washer has a generally frusto-conical shape and has a central, through aperture formed therein, and wherein the lower end of the inner nut barrel portion extends through the aperture in the washer and is curled under the internal edge of the washer defining the aperture to retain the parts in an assembly wherein the undersurface of the skirt on the outer nut barrel portion rotatably bears against the adjacent convex face of the washer; the improvement comprising a peripheral bearing ring disposed on the said inner barrel portion adjacent the lower end thereof, said ring having been formed from metal taken from the outer wall of said inner barrel portion and compressed into said ring formation, said ring including an undersurface lying at a selectively predetermined angle to the longitudinal axis of said nut, and said washer having an upper surface adjacent the opening therein, said surface being complementary to and in confrontation with the undersurface of said ring, the said fastener assembly providing for an improved torque-tensile relationship in effecting an attachment wherein the fastener assembly is applied to a cooperating male fastener element and tightened against the surface of an apertured member through which the male element extends.

2. A fastener assembly according to claim 1 wherein the said undersurface of said bearing ring lies at an acute angle to the longitudinal axis of said nut.

3. A fastener assembly according to claim 1 wherein the said outer barrel portion of said nut is externally shaped for engagement by a tool for rotating said nut.

4. A fastener assembly according to claim 3 wherein said inner barrel portion proximate the junction with said outer barrel portion has a radially enlarged depression of limited axial extent formed therein, the shape of said depression corresponding to the shape of the said outer barrel portion.

5. A fastener assembly according to claim 4 wherein the said inner barrel portion defined by said radially enlarged depression carries less than a full depth thread.

6. A fastener assembly according to claim 1 wherein the said bearing ring lies substantially coplanar with the said skirt on said outer nut barrel portion.

7. A fastener assembly according to claim 1 wherein the said bearing ring has a generally triangular configuration as viewed in cross section.

8. A fastener assembly according to claim 1 wherein the undersurface of said washer is recessed adjacent the aperture therein, and the terminal portion of the lower end of said inner nut barrel portion is disposed in said recess.

9. A fastener assembly according to claim 1 wherein the said inner barrel portion of said nut carries an internal, multiconvolution thread of a standard type adapted for engagement with a cooperating threaded bolt.

10. A fastener assembly according to claim 8 wherein said washer includes a shallow lip projecting from the upper convex surface thereof, the said lip embodying the said upper surface confronting the undersurface of said bearing ring, and the said recess in the undersurface of said washer being disposed opposite said lip, the inboard extremities of said lip and said recess intersecting in a narrow rim defining the edge of the through aperture in said washer, said rim being rotatably secured to said nut and lying between the curled end of said inner barrel portion and the undersurface of said bearing ring.

11. A fastener assembly according to claim 1 wherein said peripheral skirt on said outer nut barrel portion bears against a localized area of the convex surface of said washer, said localized area being less than one-half the total area of the said convex surface.

12. A fastener assembly according to claim 1 wherein the said bearing ring is slightly spaced from the said complementary, confronting surface on said washer to insure that the said peripheral skirt on said outer nut barrel portion bears against the said convex surface of the washer to provide for effective tensioning of a cooperating male fastener element when relatively low torque is applied to the nut during tightening of the fastener assembly against the surface of the member through which the male element extends.

13. In a fastener assembly of the type wherein a sheet metal nut having inner and outer barrel portions is rotatably assembled with an apertured washer, and wherein said outer barrel portion embodies means rotatably bearing on said washer outwardly of the aperture therein, an improved nut to washer connection comprising a connecting collar on said inner nut barrel portion which is curled under the internal edge of the aperture in the washer, said washer having a recess formed in the undersurface thereof in which portions of said collar are seated, and a peripheral bearing ring on said inner nut barrel portion disposed adjacent said collar, said bearing ring having been formed from material taken from said inner barrel portion and compressed into said ring configuration, said bearing ring having an undersurface disposed at a selectively predetermined angle to the longitudinal axis of said nut, said washer having a surface adjacent the aperture therein, said surface lying complementary to and in confrontation with the said undersurface of said bearing ring, said connecting collar and bearing ring cooperating to maintain said nut and washer in a relative rotary assembly wherein the said components are free spinning with respect to each other, whereby said fastener assembly is adapted to provide an improved torque-tensile relationship in a coupling wherein said fastener assembly is turned onto a male fastener element protruding through an apertured member and tightened against the confronting surface of the member.

14. A sheet metal nut which is particularly adapted for assembly with a lock washer in a rotatable combination, said nut comprising an inner, threaded barrel portion, said inner barrel portion having a free end adapted to be passed through an opening in a lock washer and flared outwardly beneath a surface of the washer to effect an assembly with the washer and having a peripheral bearing ring disposed on its outer wall adjacent the said free end, said bearing ring having been formed from metal skived from the said free end and compacted into said bearing ring configuration, said bearing ring generally having the shape of a horizontally disposed letter "V" as viewed in cross section and presenting a surface proximate said free end which is disposed at an angle not substantially greater than 45° to the longitudinal axis of said inner barrel portion, said surface being adapted to be brought into confrontation with a complementary bearing surface on a lock washer when the nut is assembled with the washer, and an outer barrel portion joined to the end of said inner barrel portion remote from said free end through a connecting web, said outer barrel portion being disposed in at least partially spaced, circumscribing relationship to said inner barrel portion and having a peripheral, washer engaging skirt extending laterally from its remote end from said web, said outer barrel portion having a hexagonal configuration and thus preventing six wrenching faces, the end of said inner barrel portion proximate said connecting web having a hexagonal depression of limited axial extent formed therein and presenting six faces opposite to and matching the said wrenching face, said hexagonal section of said inner barrel portion being effective to transmit torque from said outer barrel portion to said inner barrel portion when said nut is turned onto a mating bolt with a tool engaging the said wrenching faces on said outer barrel portion and to reduce the torsional strain on said connecting web incident to ultimate tightening of said nut on a bolt.

* * * * *